United States Patent
Ma et al.

(10) Patent No.: US 8,428,345 B2
(45) Date of Patent: Apr. 23, 2013

(54) META-CLASSIFIER SYSTEM FOR VIDEO ANALYTICS

(75) Inventors: Yunqian Ma, Plymouth, MN (US);
Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 467 days.

(21) Appl. No.: 12/716,940

(22) Filed: Mar. 3, 2010

(65) Prior Publication Data

US 2011/0216964 A1   Sep. 8, 2011

(51) Int. Cl.
*G06K 9/62* (2006.01)

(52) U.S. Cl.
USPC ........... 382/159; 382/103; 382/181; 382/190; 382/225; 706/12

(58) Field of Classification Search .................. None
See application file for complete search history.

(56) References Cited

U.S. PATENT DOCUMENTS

| | | |
|---|---|---|
| 7,107,254 B1 | 9/2006 | Dumais et al. |
| 7,519,217 B2 | 4/2009 | Liu et al. |
| 7,899,625 B2 | 3/2011 | Bhanot et al. |
| 2005/0286772 A1 | 12/2005 | Albertelli |
| 2006/0110028 A1 | 5/2006 | Liu et al. |
| 2009/0299999 A1 | 12/2009 | Loui et al. |
| 2010/0054540 A1* | 3/2010 | Brown et al. .............. 382/107 |
| 2010/0250537 A1* | 9/2010 | Van De Par ............... 707/737 |

OTHER PUBLICATIONS

Fathi et al., "Action Recognition by Learning Mid-Level Motion Features," 8 pages, prior to Mar. 3, 2010.
Lin et al., "Meta-classification of Multimedia Classifiers," 6 pages, prior to Mar. 3, 2010.
Borca-Muresan et al., "Meta-Classifier for Pedestrian Attitude Recognition," IEEE, pp. 33-40, 2008.
Chen et al., "Fast Human Detection Using a Novel Boosted Cascading Structure with Meta Stages," IEEE Transactions on Image Processing, vol. 17, No. 8, pp. 1452-1464, Aug. 2008.
Combined Search and Examination Report for GB application No. GB1020649.8, Dated Apr. 1, 2011.

* cited by examiner

*Primary Examiner* — Claire X Wang
*Assistant Examiner* — David Perlman
(74) *Attorney, Agent, or Firm* — Seager Tufte & Wickhem LLC (57) ABSTRACT

A system for meta-classification having a training phase mechanism and an operational phase mechanism. The training phase mechanism may have a detection and tracking module, a classifier section connected to the detection and tracking module, a feature synthesis module connected to the classifier section, a labeling module connected to the feature synthesis module and a training data module connected to the labeling module. The operational phase mechanism may have a detection and tracking module, a classifier section connected to the detection and tracking module, a feature synthesis module connected to the classifier section and a meta-classification module connected to the feature synthesis module and the training module. The training phase mechanism may provide parameters and settings to the operational phase mechanism.

14 Claims, 6 Drawing Sheets

META-CLASSIFIER SYSTEM FOR VIDEO ANALYTICS

The U.S. Government may have certain rights in the present application.

The present application is related to U.S. patent application Ser. No. 11/548,185, filed Oct. 10, 2006, and entitled "A Seamless Tracking Framework Using Hierarchical Tracklet Association". U.S. patent application Ser. No. 11/548,185, filed Oct. 10, 2006, is hereby incorporated by reference.

BACKGROUND

The invention pertains detection and tracking objects and particularly to classifying these objects.

SUMMARY

The invention is a system for meta-classification having a training phase mechanism and an operational phase mechanism. The training phase mechanism may have a detection and tracking module, a classifier section connected to the detection and tracking module, a feature synthesis module connected to the classifier section, a labeling module connected to the feature synthesis module and a training data module connected to the labeling module. The operational phase mechanism may have a detection and tracking module, a classifier section connected to the detection and tracking module, a feature synthesis module connected to the classifier section and a meta-classification module connected to the feature synthesis module and the training module. The training phase mechanism may provide parameters and settings to the operational phase mechanism.

DESCRIPTION

A challenge here is to build a video indexing and retrieval system which allows a video analyst to quickly and accurately find the video content of interest from archives. A technical problem with this approach concerns query formulation for archive retrieval. Also, the approach may be extended to streaming video as well.

There may be two phases in this approach. One is a training phase, and the other is a test or operational phase. Suppose that one has ground truth data, which means the data have been labeled, one may use it as the training data. The training data may be used to learn the parameters of the system. In the operational phase, data do not have associated label data, so the learned system (through the learned parameters) will label the operational data.

The video data in the database are the descriptors for a variety of activities of one or more objects in the video data. These activities may be people standing, people running, carrying and gesturing, cars turning, vehicles accelerating, and so on.

The present approach may be a use of a meta-classifier on the multi-modal classifier results from different classifier descriptors. The meta-classifier may make the final decision by re-classifying the result each classifier descriptor returns.

The inputs to the present approach may be the following classifier descriptors, such as: vectors [p(dig), p(gesture), p(walk), p(run), p(stand), p(carry) . . . ]. Also one may consider a multiple type of classifier output as well, such as [p1(dig), p1(gesture), p1(walk), p1(run), p1(stand), p1(carry), . . . ] and [p2(dig), p2(gesture), p2(walk), p1(run), p2(stand), p2(carry), . . . ].

Given the above input of a couple sets of classifier descriptors extracted from a query video clip, one should determine the relevant activity by using the meta-classifier approach, in order to retrieve other instances of the relevant activity.

The main approach may represent the results of each individual classifier as a feature element, and forms a feature vector, and then applies the re-classifier again to the formed feature space.

There may be two ways for this meta-classifier procedure. One way is to use a Bayesian classifier with which one can get the prior and the likelihood from the existing data, and calculate the posterior from the observation. Another way may be to suppose that one has a classifier descriptor 1 which generates 21 classifier outputs, and has a classifier descriptor 2 which generates 21 classifier outputs. Then one may form a 42 dimension feature space. After that, one may train the meta-classifier using the available training data. And one may use the trained meta-classifier on the operational phase.

The metadata descriptors may come from an XML format. Thus, one may extract the classifier descriptors from the XML file. For example, for each query clip, one may have the query XML, from which one can extract the classifier descriptor.

If the number of classifier descriptors is greater than one for each type, one may calculate the mean value or the max value as the feature. After the training data are formed, one may use a classifier approach, such as a support vector machine, on the combined feature data to train the model. After that, one may use the trained model on the test data.

Figure 1:
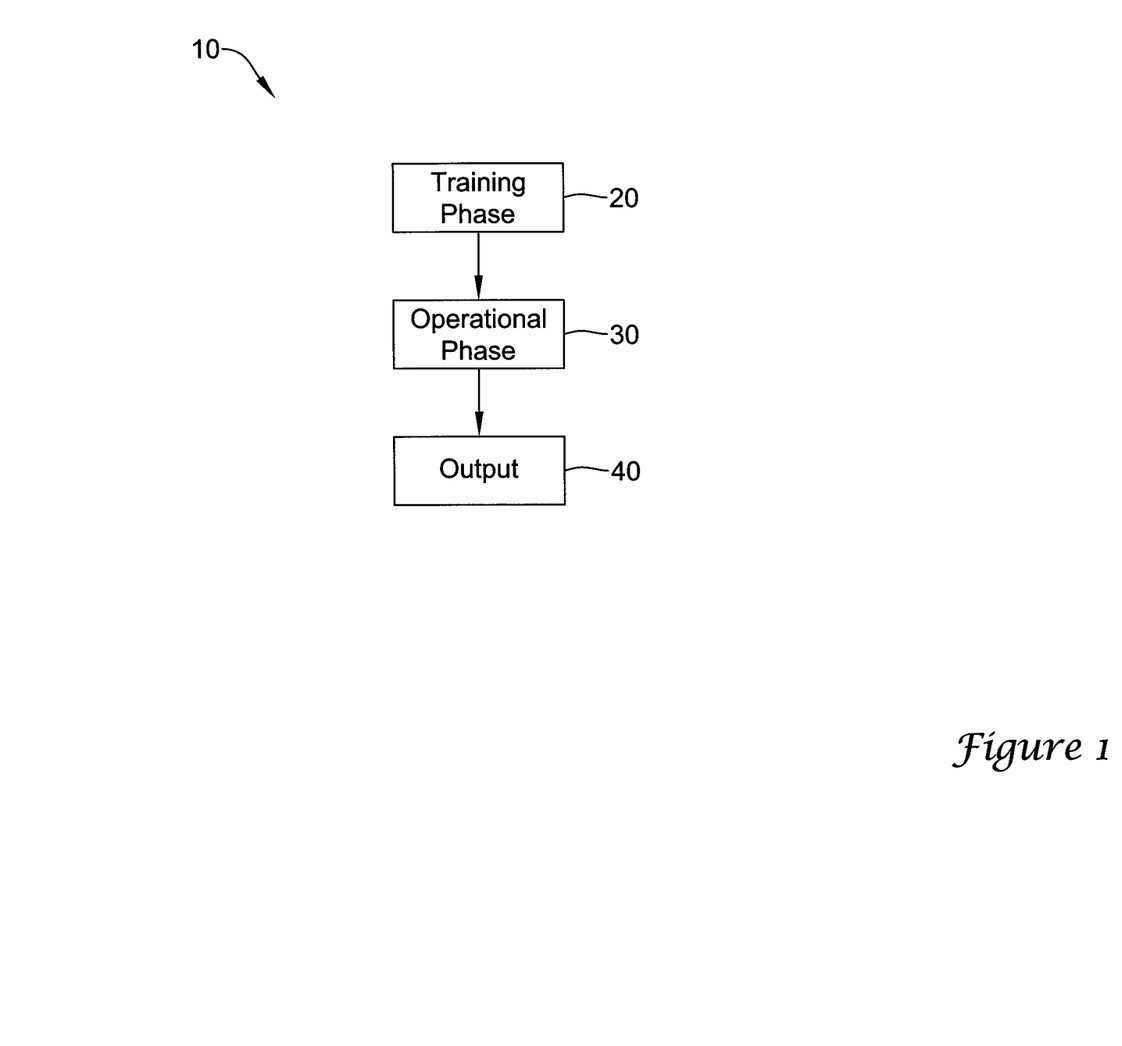
FIG. 1 is a block diagram of the present system.

FIG. 1 is a diagram of a system 10 which may a regarded as a meta-classifier. System 10 may have a training phase 20, with an operational phase 30 following phase 20. System 10 may have an output 40 from operational phase 30.

Figure 2A:
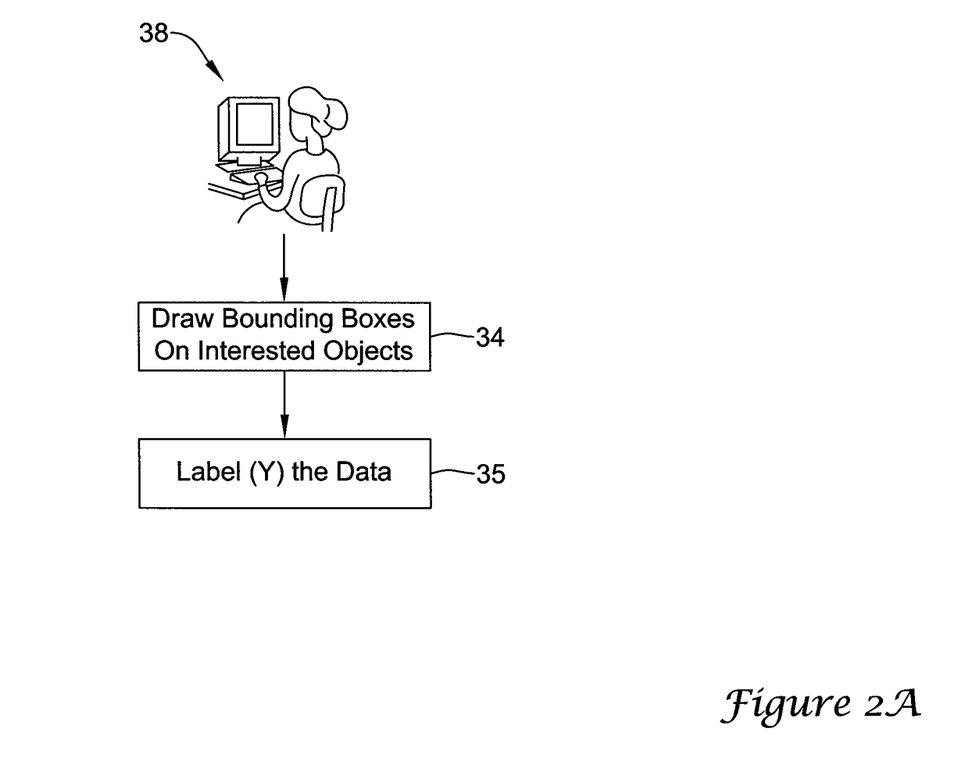
FIGS. 2a and 2b are diagrams of a training phase of the system.
Figure 2B:
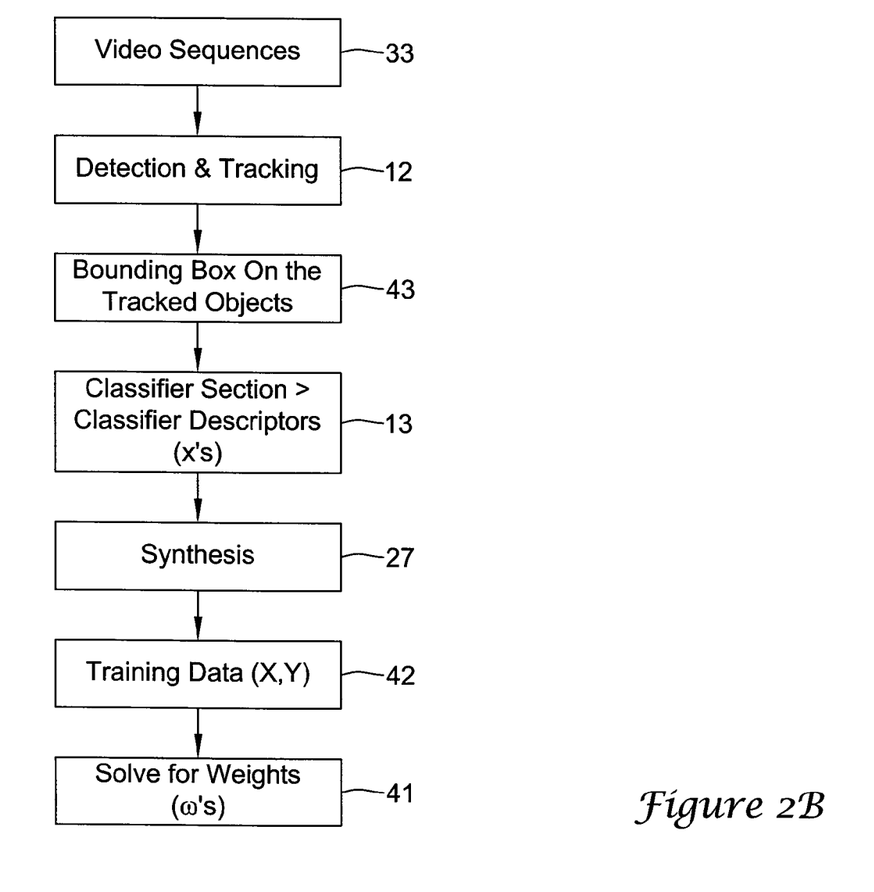

FIGS. 2a and 2b are diagrams of training data for forming labels, i.e., training phase, from a subject in video sequences. A bounding box 31 may be drawn around the subject of interest in an example video image 32 shown in FIG. 3. The video image 32 may be of a video sequence taken, for example, by an unmanned aerial vehicle (UAV), e.g., a drone, of enemy territory. Symbol 31 or bounding box is shown to be situated on a car but it could be on a person or other item of interest. Video images 32 of sequences may include kinematics involving a center of a bounding box 31, position, velocity, and so on. Items of interest may include people running, a car moving, a car accelerating, a waving hand, and so on. There could be a number (e.g., ~100) of video sequences 33 for the training phase. As examples, a jumping item may be in 20 sequences, an accelerating item may be in 30 sequences, items falling down in 10 sequences, items opening a car trunk in 15 sequences, items digging in 10 sequences, and 15 items waving. At the detection module and next step of symbol 34, a person may draw bounding boxes 31 on interested objects in each image 32 the video sequences 33. The images 32 may go through two or more classifier channels, e.g., 14-16, with classifier descriptors (x's) being combined at synthesis module 27. At symbol 35, during the training phase, the data may be provided with a label (Y). The learning system through the weights (ω's) associated with classifier descriptors may be solved at symbol 41. Weight solutions (ω's) may be provided as training data at symbol 42.

Figure 3:
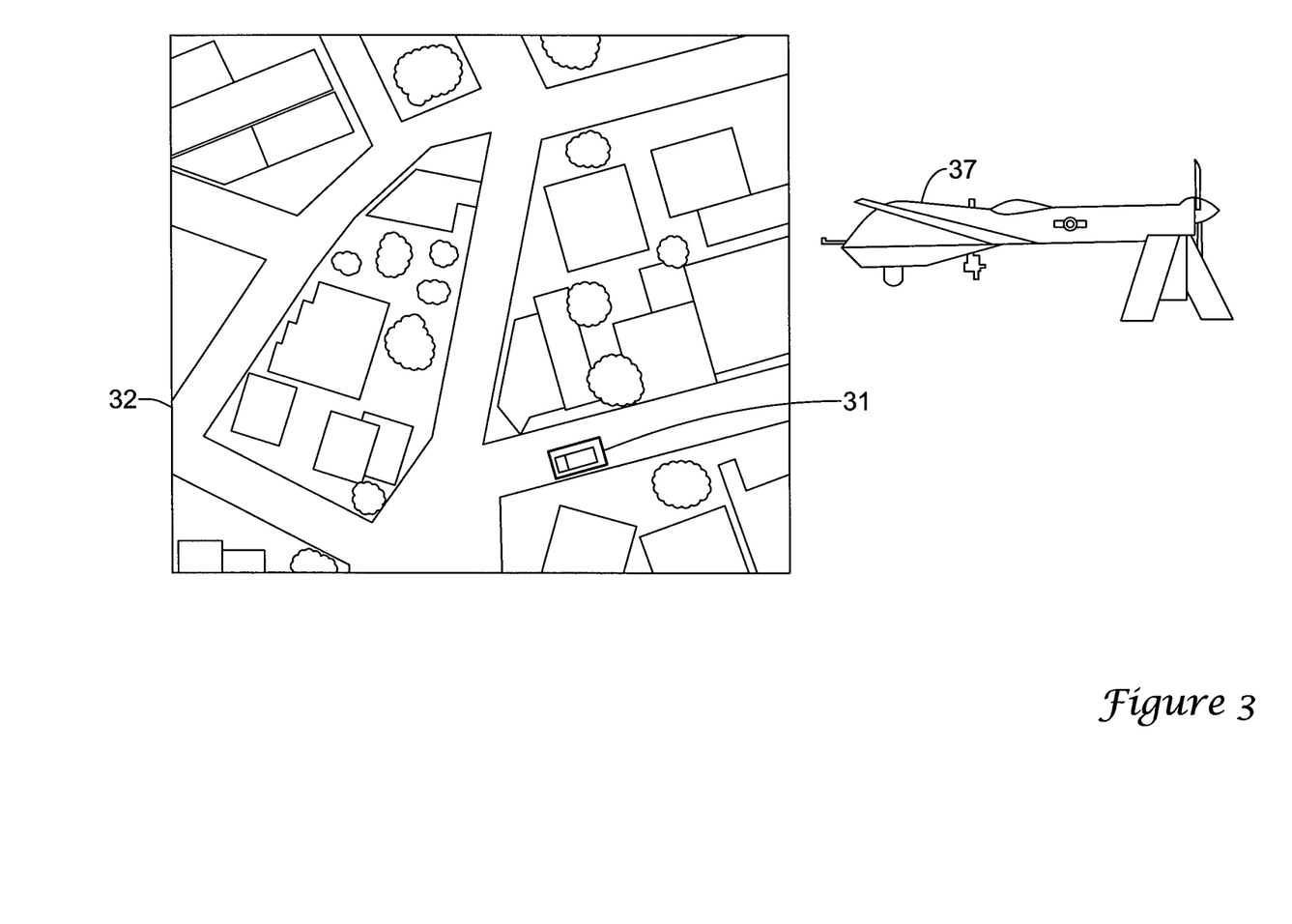
FIG. 3 is a diagram of an image applicable to the training phase.

The training phase 20 may receive a set of video sequences 33 which may be viewed by a person 38 on a display or screen of a processor receiving video sequences 33. FIG. 3 shows the example video image sequence 32 which may be an image of one of the sequences 33. Interesting objects may be noted by person 38 who may draw bounding boxes on the interested objects as indicated at symbol 34. Bounding box 31 around an interesting object (e.g., a car) is an example in image 32. Image 32 may presented to the person or operator 38 on the screen for viewing and drawing bounding boxes. The sequences 33 may be taken by a video camera in, for example, a UAV drone 37 flying over an area containing interesting objects. There is a bounding box 43, resulting from the detection and tracking block 12. During the training phase, the bounding box resulting from the detection and tracking will have an intersection with the bounding box which the human operator 38 draws, then the video activity data may get the label.

The interesting object or objects may be observed in terms of various activities resulting in a collection of data of the object or objects. The data may be noted in terms of probabilities $x_1$ through $x_N$ for a set of N activities. A probability $x_1$ for an activity 1 may indicate the probability of the object of interest as a certain item performing activity 1. A probability $x_2$ for an activity 2 may indicate the probability the object of interest as a certain item performing activity 2. The probability x may be determined for N activities. One may say "N=60", that is, there can be 20 different activities with probabilities determined with 3 methods for illustrative purposes. From numerous sequences, one may obtain values x for each of the N activities. Also, these values x may be multiplied by a weight ω resulting in an equation for a label provided by the operator on the data. $Y=\omega_1 x_1+\omega_2 x_2+\ldots+\omega_{60} x_{60}$. At this phase, the ω terms are solved for and determined. Each ω may represent a weight from 0 to 1.

Figure 4:
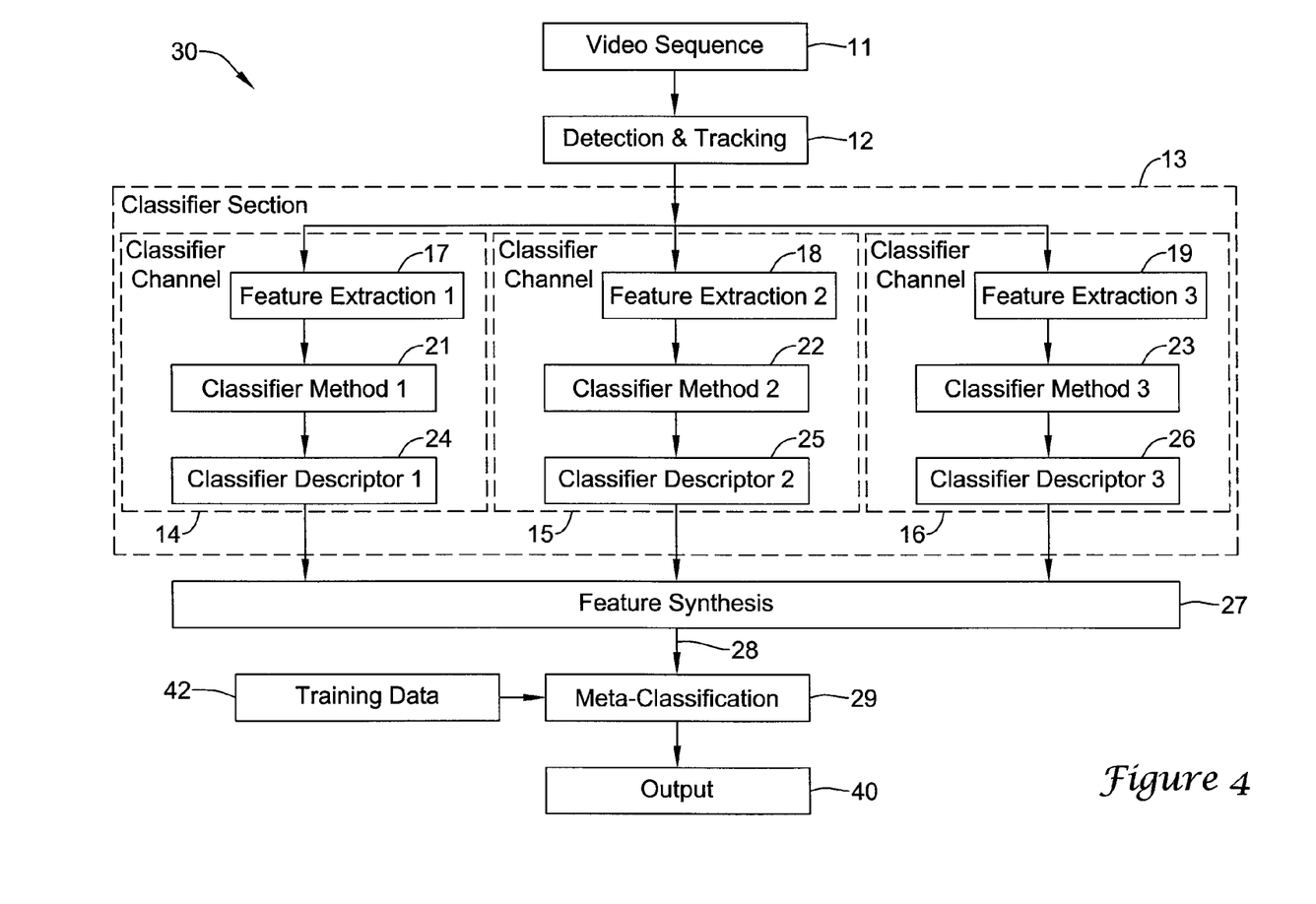
FIG. 4 is a diagram of an operational phase of the system.

The solutions at symbol 41 for $\omega_1$ through $\omega_{60}$ may be represented by symbols $W_1$ through $W_{60}$, respectively. At symbol 42, the solutions (W's) for the ω's may be entered as or with training data at a meta-classification module 29 in FIG. 4. Module 29 may be represented by the equation:

$$Y=W_1 x_1=W_2 x_2+\ldots+W_{60} x_{60}.$$

Figure 5:
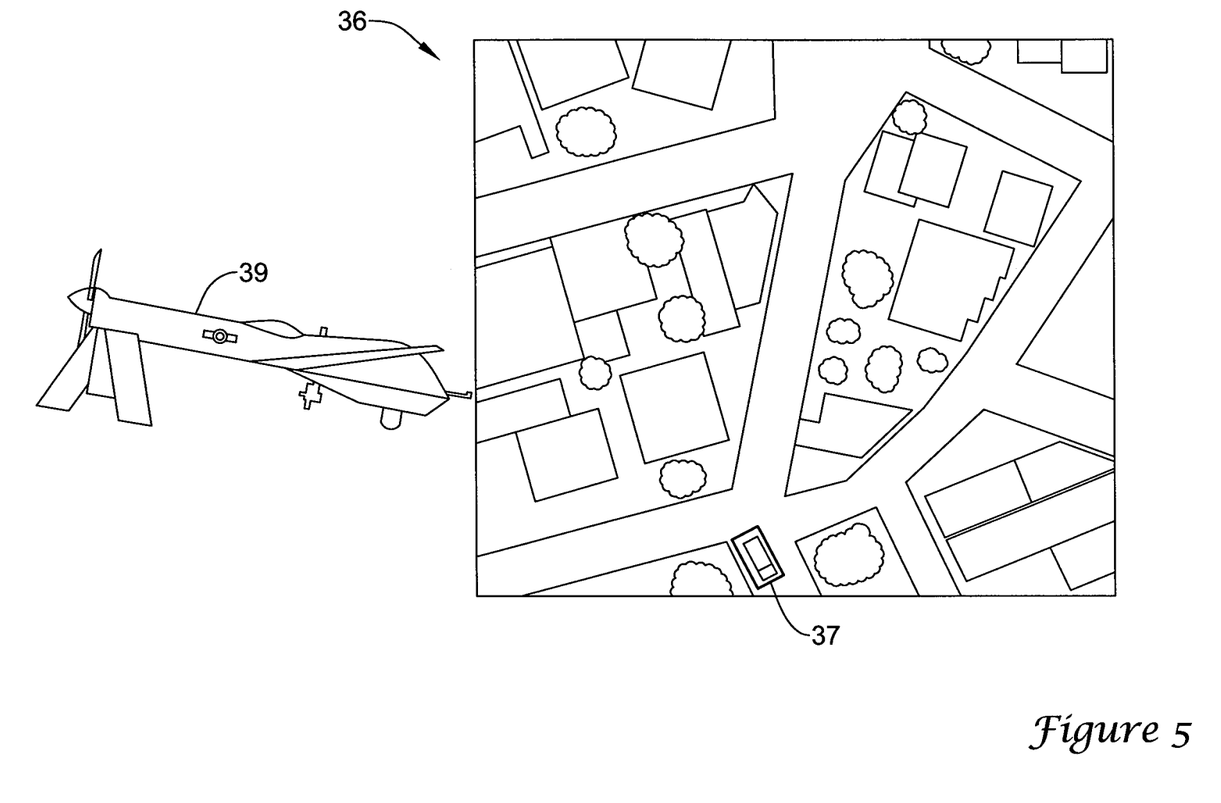
FIG. 5 is a diagram of an image applicable to the operational phase.

With the information of the equation, one may proceed to the test or operational phase 30 of the system as illustrated in FIG. 4. A video sequence 11 may be input to a detection and tracking module 12. The detection and tracking module 12 may place a boundary box 37 on an item of interest as of an image 36 of a video sequence as shown in FIG. 5. The video may be from a camera mounted in an unmanned aerial vehicle 39. Information from module 12 may go to classifier channels 14-16 of classifier section 13.

A classifier channel 14 may have a feature extractor 17 connected to an output of module 12, and a classifier method module 21 connected to an output of feature extractor 17. An output of the classifier method module 21 may be a classifier descriptor 24. A classifier channel 15 may have a feature extractor 18 connected to the output of module 12, and a classifier method module 22 connected to an output of feature extractor 18. An output of classifier method module 22 may be a classifier descriptor 25. A classifier channel 16 may have a feature extractor 19 connected to the output of module 12, and a classifier method module 23 connected to an output of feature extractor 19. An output of classifier method module 23 may be a classifier descriptor 26.

The descriptor outputs 24, 25 and 26 may provide three sets of probability values of x for the 20 activities as shown with the following examples. These values may be referred to as dimensions. The classifier descriptor 24 of the first classifier method 24 may be (0.2, 0.3, 0.1, 0.6, 0.3, 0.8, 0.9, 0.4, 0.5, 0.1, 0.7, 0.9, 0.4, 0.6, 0.3, 0.7, 0.1, 0.2, 0.6, 0.5) for each activity, respectively, for 20 activities being assessed. The activities may include walking, sitting, running, waving, acceleration, one or more of these properties involving a person or a car, and so on. The same 20 activities may be assessed for the same boxed object by one or more additional classifier methods. In the present example, the total number of methods is three even though it may two or more than three. An example output of the second method 22 as classifier descriptor 25 may be (0.5, 0.6, 0.2, 0.1 0.7, 0.3 0.6, 0.4, 0.9, 0.7 0.1, 0.5, 0.4 0.9, 0.8, 0.3, 0.6, 0.1, 0.3, 0.2). An example output of the second method 23 as classifier descriptor 26 may be (0.9, 0.4, 0.7, 0.6, 0.1, 0.3, 0.7, 0.5, 0.1, 0.4, 0.2, 0.9, 0.6, 0.8, 0.5, 0.3, 0.2, 0.1, 0.3, 0.6).

The outputs 24, 25 and 26 may go to the feature synthesis module 27 and be combined into a multiple type of classifier or 60 dimension output. Such output may be (0.2, 0.3, 0.1, 0.6, 0.3, 0.8, 0.9, 0.4, 0.5, 0.1, 0.7, 0.9, 0.4, 0.6, 0.3, 0.7, 0.1, 0.2, 0.6, 0.5, 0.5, 0.6, 0.2, 0.1, 0.7, 0.3, 0.6, 0.4, 0.9, 0.7, 0.1, 0.5, 0.4, 0.9, 0.8, 0.3, 0.6, 0.1, 0.3, 0.2, 0.9, 0.4, 0.7, 0.6, 0.1, 0.3, 0.7, 0.5, 0.1, 0.4, 0.2, 0.9, 0.6, 0.8, 0.5, 0.3, 0.2, 0.1, 0.3, 0.6). These values of 60 dimensions as determined by the three methods for the twenty activities may be an output of feature synthesis module 27 to meta-classification module 29. In module 29, these dimensions may be plugged into an equation, $Y=\omega_1 x_1+\omega_2 x_2+\omega_3 x_3+\ldots+\omega_{60} x_{60}+\text{bias}$, to result in an equation with W representing the actual values. Since the values of $\omega_1, \omega_2, \omega_3, \ldots, \omega_{60}$ as $W_1, W_2, W_3, \ldots, W_{60}$ may be determined by training phase 20, in that the equation used in the operational phase may be solved for Y to obtain a label. Y or the solved-for label may be regarded as an output 40 of system 10.

The formula of module 29 may be expressed in several ways. One expression may include the following equation, where W is the determined weight and x is the probability of the respective activity, N is the number of dimensions and M is the number of methods.

$$Y=W_1 x_1, W_2 x_2, \ldots, W_N x_N, W_{N+1} x_{N+1},$$
$$W_{N+2} x_{N+2}, \ldots, W_{N+N} x_{N+N}, W_{2N+1} x_{2N+1},$$
$$W_{2N+2} x_{2N+2}, \ldots, W_{2N+N} x_{2N+N}, W_{3N+1} x_{3N+1},$$
$$W_{3N+2} x_{3N+2}, \ldots, W_{4N} x_{4N}, \ldots, W_{MN} x_{MN}+\text{bias},$$
where and $N \geq 2$ and $M \geq 2$.

A shorter version of the equation may be $$Y=W_1 x_1, \ldots, W_N x_N, W_{N+1} x_{N+1}, \ldots, W_{MN} x_{MN}+\text{bias}.$$

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A system for meta-classification of surveillance video comprising:
   a video acquisition mechanism configured to acquire surveillance video;
   a training phase mechanism; and
   an operational phase mechanism;

wherein:
the training phase mechanism comprises:
a detection and tracking module configured to add bounding boxes to interesting objects in a training surveillance video acquired by the video acquisition mechanism;
a workstation with a screen configured to allow a human operator to draw bounding boxes on interesting objects in the training surveillance video;
a classifier section connected to the detection and tracking module, the classifier section including a plurality of classifier channels, each of the plurality of classifier channels configured, for the interesting objects in the training surveillance video, to output a list of features and their respective likelihoods of occurrences, wherein the list of features is common between all of the plurality of classifier channels;
a feature synthesis module connected to the classifier section, the feature synthesis module configured to combine the lists of features from the plurality of classifier channels into a combined list of features;
a labeling module configured to apply labels provided by the human operator to the combined list of features and to determine weights of the likelihoods of occurrences; and
a training data module connected to the labeling module and receiving the weights;
the operational phase mechanism comprises:
a detection and tracking module configured to add bounding boxes to interesting objects in an operational surveillance video acquired by the video acquisition mechanism;
a classifier section connected to the detection and tracking module, the classifier section including a plurality of classifier channels, each of the plurality of classifier channels configured, for the interesting objects in the operational surveillance video, to output a list of features and their respective likelihoods of occurrences;
a feature synthesis module connected to the classifier section, the feature synthesis module configured to combine the lists of features from the plurality of classifier channels into a combined list of features; and
a meta-classification module connected to the feature synthesis module and the training data module, the meta-classification module configured to determine labels for the interesting objects in the operational surveillance video using the weights from the training data module and the likelihoods of occurrences of the combined list of features from the feature synthesis module.

2. The system of claim 1, wherein a classifier channel comprises:
a feature extraction module connected to the detection and tracking module; and
a classifier module connected to the feature extraction module and the feature synthesis module.

3. The system of claim 1, wherein the weights of the likelihoods of occurrences are solved-for from the labels and the likelihoods of occurrences of respective features.

4. A method for meta-classification of surveillance video, comprising:
acquiring one or more training video sequences with a video camera;
selecting out one or more objects of interest in the one or more training video sequences with a detection and tracking module;
applying two or more classifier channels to the one or more objects of interest to get classifier descriptor data having likelihoods of occurrences of activities of the one or more objects of interest, wherein all of the two or more classifier channels provide likelihoods of occurrences of a common set of activities;
combining the classifier descriptor data from the two or more classifier channels with a feature synthesis module;
labeling the classifier descriptor data by a human operator;
determining weights for the likelihoods of occurrences of activities of the one or more objects of interest;
acquiring an operational video sequence with a video camera;
selecting a test object from the operational video sequence with the detection and tracking module;
applying the two or more classifier channels to the test object to obtain classifier descriptor data of activities of the test object, having likelihoods of occurrences of activities of the test object;
and
determining a meta-classification label from the classifier descriptor data of activities of the test object and the weights for the likelihoods of occurrences of activities with a meta-classification module.

5. The method of claim 4, wherein the weights for the likelihoods of occurrences of activities of the one or more objects of interest are determined from the labeling of the classifier description data and from likelihoods of occurrences of activities of the one or more objects of interest.

6. The method of claim 4, wherein each of the two or more classifier channels comprises:
a feature extraction module; and
a classifier method module connected to the feature extraction module.

7. The method of claim 6, wherein a classifier method module of one classified channel does not provide the same descriptor data as a classifier method module of another classified channel.

8. The method of claim 4, wherein the weights for the likelihoods of occurrences of activities are training data for determining a meta-classification label.

9. A meta-classifier system comprising:
a video module;
a detection and tracking module having an object selector, the detection and tracking module configured to receive one or more video sequences from the video module, and the object selector configured to select an object of interest in the one or more video sequences;
a classifier section connected to the detection and tracking module and configured to provide two or more sets of descriptors of activities of the object of interest, wherein each descriptor of an activity of the object of interest indicates a probability of the activity, further wherein each of the two or more sets of descriptors of activities includes probabilities of a common set of activities;
a synthesis module connected to the classifier section and configured to output a combined set of descriptors comprising the two or more sets of descriptors of activities provided by the classifier section;
a labeling module connected to the synthesis module and configured to apply a label provided by a human to the combined set of descriptors and to determine a weight for each descriptor from the combined set of descriptors and the label;

a training module connected to the labeling module and configured to receive the weight of each descriptor as data; and a meta-classification module connected to the synthesis module and the training module, the meta-classification module configured to determine labels for a second object of interest in a second video sequence with a second combined set of descriptors and the data from the training module, wherein the second video sequence is subject to processing by the detection and tracking module, the classifier section, and the synthesis module, such processing including generating the second combined set of descriptors.

10. The system of claim 9, wherein the classifier section comprises:

two or more feature extractors connected to the detection and tracking module; and two or more classifier method modules connected to the two or more feature extractors, respectively, and connected to the synthesis module.

11. The system of claim 9, wherein processing of the second video sequence includes:

providing the second video sequence to the detection and tracking module;

selecting the second object of interest in the second video sequence with the detection and tracking module;

the classifier section providing two or more sets of descriptors of activities of the second object of interest to the synthesizer module; and the synthesizer module outputting to the meta-classification module the second combined set of descriptors comprising the two or more sets of descriptors of activities of the second object of interest.

12. The system of claim 1, wherein intersecting bounding boxes of both the detection and tracking module and the human operator determine intersecting interesting objects, and labels are applied to the combined lists of features corresponding to intersecting interesting objects.

13. The system of claim 1, wherein the video acquisition mechanism is mounted in an aerial vehicle.

14. The system of claim 13, wherein the aerial vehicle is unmanned.

* * * * *